United States Patent [19]

Merchant et al.

[11] Patent Number: 5,851,436

[45] Date of Patent: Dec. 22, 1998

[54] NONAFLUOROMETHOXYBUTANE COMPOSITIONS

[75] Inventors: Abid Nazarali Merchant, Wilmington, Del.; Barbara Haviland Minor, Elkton, Md.; Shoeb Akberali Moiyadi, Hockessin, Del.

[73] Assignee: E. I. du Pont de Nemours and Company, Wilmington, Del.

Related U.S. Application Data

[60] Provisional application No. 60/019,691, Jun. 13, 1996.

[21] Appl. No.: 848,714

[22] Filed: May 19, 1997

[51] Int. Cl.[6] .............................. C11D 7/50; C23G 5/028; C09K 5/00

[52] U.S. Cl. .......................... 252/364; 252/67; 510/338; 510/408; 510/410; 510/411; 510/412

[58] Field of Search .................................. 252/182.11, 67, 252/188.1, 364; 134/12, 31, 38, 40, 42; 510/338, 408, 410, 411, 412

[56] References Cited

FOREIGN PATENT DOCUMENTS

| 08333292 | 12/1996 | Japan . |
|---|---|---|
| 96/22129 | 7/1996 | WIPO . |
| 96/22356 | 7/1996 | WIPO . |
| 96/36689 | 11/1996 | WIPO . |
| 96/40834 | 12/1996 | WIPO . |
| 97/14762 | 4/1997 | WIPO . |
| 97/22683 | 6/1997 | WIPO . |
| 97/28229 | 8/1997 | WIPO . |
| 97/39081 | 10/1997 | WIPO . |

*Primary Examiner*—Shean C. Wu

[57] ABSTRACT

Compositions of nonafluoromethoxybutane and cyclopentane, nonafluoromethoxybutane and cyclohexane; nonafluoromethoxybutane, cyclopentane and acetone, nonafluoromethoxybutane, cyclohexane and acetone, nonafluoromethoxybutane, trans-1,2-dichloroethylene and cyclopentane; and nonafluoromethoxybutane, trans-1,2-dichloroethylene, cyclopentane and methanol are described. These compositions are useful as cleaning agents, displacement drying agents, refrigerants, heat transfer media, expansion agents for polyolefins and polyurethanes, aerosol propellants, gaseous dielectrics, fire extinguishing agents, power cycle working fluids, polymerization media, particulate removal fluids, carrier fluids, and buffing abrasive agents.

10 Claims, No Drawings

NONAFLUOROMETHOXYBUTANE COMPOSITIONS

CROSS-REFERENCE TO RELATED APPLICATION

This application claims the benefit of U.S. Provisional Application No. 60/019,691, filed Jun. 13, 1996.

FIELD OF THE INVENTION

This invention relates to compositions containing nonafluoromethoxybutane. These compositions include nonafluoromethoxybutane and cyclopentane, nonafluoromethoxybutane and cyclohexane; nonafluoromethoxybutane, cyclopentane and acetone, nonafluoromethoxybutane, cyclohexane and acetone, nonafluoromethoxybutane, trans-1,2-dichloroethylene and cyclopentane; and nonafluoromethoxybutane, trans-1,2-dichloroethylene, cyclopentane and methanol. These compositions are useful as cleaning agents, wipe solvents, displacement drying agents, refrigerants, heat transfer media, expansion agents for polyolefins and polyurethanes, aerosol propellants, gaseous dielectrics, power cycle working fluids, fire extinguishing agents, polymerization media, particulate removal fluids, carrier fluids, and buffing abrasive agents.

BACKGROUND OF THE INVENTION

Fluorinated hydrocarbons have many uses such as cleaning agents or refrigerants. Such compounds include trichlorofluoromethane (CFC-11) and 1,1,2-trichloro-1,2,2-trifluoroethane (CFC-113).

In recent years it has been pointed out that certain kinds of fluorinated hydrocarbon compounds released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of new compounds that have a lower ozone depletion potential than existing compounds while still achieving an acceptable performance in cleaning agent and refrigeration applications.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable, if possible, to use as a refrigerant a single compound or an azeotropic or azeotrope-like composition of more than one compound.

It is also desirable to find replacements for CFCs and HCFCs for use as a cleaning agent or solvent to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. Fluorinated hydrocarbons are also useful cleaning agents in vapor degreasing operations and in wipe solvent applications.

Preferably, cleaning agents should have a low boiling point, nonflammability, low toxicity, and high solvency power so that flux and flux-residues can be removed without damaging the substrate being cleaned. Further, it is desirable that cleaning agents that include a fluorinated hydrocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or could have less-desirable solvency properties, such as lower rosin flux solvency and lower inertness toward the electrical components being cleaned. The azeotropic property is also desirable in vapor degreasing operations because the cleaning agent is generally redistilled and reused for final rinse cleaning. Replacements may also be useful as wipe solvents.

Replacements for CFCs and HCFCs may also useful as blowing agents in the manufacture of closed-cell polyurethane, phenolic and thermoplastic foams, as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

Accordingly, it has been found that compositions containing nonafluoromethoxybutane have a lower ozone depletion potential and are suitable refrigerants, blowing agents, cleaning agents, heat transfer media, etc.

SUMMARY OF THE INVENTION

The present invention relates to the following binary compositions: a first component, nonafluoromethoxybutane and a second component, wherein the second component is selected from the group consisting of cyclopentane and cyclohexane.

The present invention also relates to the following ternary compositions: a first component, nonafluoromethoxybutane, a second component, wherein the second component is selected from the group consisting of cyclopentane or cyclohexane and a third component, acetone.

The present invention also relates to the following ternary composition: a first component, nonafluoromethoxybutane, a second component, trans-1,2-dichloroethylene (trans-1,2-DCE) and a third component, cyclopentane.

The present invention also relates to the following quaternary composition: a first component, nonafluoromethoxybutane, a second component, trans-1,2-DCE, a third component, cyclopentane and a fourth component, methanol.

These compositions are useful as cleaning agents, displacement drying agents, refrigerants, wipe solvents, expansion agents for polyolefins and polyurethanes, aerosol propellants, heat transfer media, gaseous dielectrics, power cycle working fluids, polymerization media, particulate removal fluids, fire extinguishants, carrier fluids, and buffing abrasive agents.

Further, the invention relates to the discovery of azeotropic or azeotrope-like compositions comprising effective amounts of these components to form an azeotropic or azeotrope-like composition.

DETAILED DESCRIPTION

The present invention relates to the discovery of binary compositions of nonafluoromethoxybutane ($C_4F_9OCH_3$) and cyclopentane or cyclohexane.

The present invention relates to the discovery of ternary compositions of $C_4F_9OCH_3$, cyclopentane and acetone; or $C_4F_9OCH_3$, cyclohexane and acetone; or $C_4F_9OCH_3$, trans-1,2-DCE and acetone.

The present invention relates to the discovery of a quaternary composition of $C_4F_9OCH_3$, trans-1,2-DCE, cyclopentane and methanol.

1–99 wt. % of each of the components in the above compositions can be used as cleaning agents, displacement drying agents, refrigerants, expansion agents for polyolefins and polyurethanes, aerosol propellants, heat transfer media, gaseous dielectrics, fire extinguishants, power cycle working fluids, polymerization media, particulate removal fluids, carrier fluids, and buffing abrasive agents.

The present invention also relates to the discovery of azeotropic or azeotrope-like compositions of effective amounts of $C_4F_9OCH_3$ and cyclopentane; $C_4F_9OCH_3$ and cyclohexane; $C_4F_9OCH_3$, cyclopentane and acetone; $C_4F_9OCH_3$, cyclohexane and acetone; $C_4F_9OCH_3$, trans-1,2-DCE and cyclopentane; or $C_4F_9OCH_3$, trans-1,2-DCE, cyclopentane and methanol to form an azeotropic or azeotrope-like composition.

Nonafluoromethoxybutane ($C_4F_9OCH_3$) isomers of the present invention include 1,1,1,3,3,3-hexafluoro-2-methoxy-2-(trifluoromethyl)-propane ($CH_3OC(CF_3)_3$), 1,1,1,2,2,3,3,4,4-nonafluoro-4-methoxy-butane ($CH_3OCF_2CF_2CF_2CF_3$), 1,1,1,2,3,3-hexafluoro-2-(trifluoromethyl)-3-methoxy-propane ($CH_3OCF_2CF(CF_3)_2$), and 1,1,1,2,3,3,4,4,4-nonafluoro-2-methoxybutane ($CH_3OCF(CF_3)CF_2CF_3$) with approximate isomer boiling points of 60° C. Other components of the compositions of the present invention include the following:

1. methanol ($CH_3OH$), boiling point=65° C.
2. trans-1,2-dichloroethylene ($CHCl=CHCl$), boiling point=48° C.
3. acetone, ($CH_3COCH_3$), boiling point=56° C.
4. cyclopentane, cyclo($CH_2$)$_5$, boiling point=41° C.
5. cyclohexane, cyclo($CH_2$)$_6$, boiling point=81° C.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is little difference in vapor pressure between the original composition and the composition remaining after 50 weight percent of the original composition has been removed.

Therefore, included in this invention are compositions of effective amounts of $C_4F_9OCH_3$ and cyclopentane; $C_4F_9OCH_3$ and cyclohexane; $C_4F_9OCH_3$, cyclopentane and acetone; $C_4F_9OCH_3$, cyclohexane and acetone; $C_4F_9OCH_3$, trans-1,2-DCE and cyclopentane; or $C_4F_9OCH_3$, trans-1,2-DCE, cyclopentane and methanol such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures:

| Component | 40.0° C. Psia | 42.8° C. Psia | 57.8° C. Psia | 58.0° C. Psia |
|---|---|---|---|---|
| $C_4F_9OCH_3$ | 7.30 | 8.10 | 13.66 | 13.76 |
| Acetone | 8.19 | 9.11 | 15.52 | 15.63 |
| Cyclopentane | 10.73 | 11.82 | 19.30 | 19.42 |
| Cyclohexane | 3.57 | 3.99 | 6.97 | 7.02 |
| Trans-1,2-DCE | 11.27 | 12.43 | 20.41 | 20.54 |
| Methanol | 4.91 | 5.59 | 10.73 | 10.82 |

Substantially constant boiling, azeotropic or azeotrope-like compositions of this invention comprise the following at the temperature specified:

| COMPONENTS | T(°C.) | WEIGHT RANGES (wt.%/wt/%) | PREFERRED (wt.%/wt.%) |
|---|---|---|---|
| $C_4F_9OCH_3$ Azeotropes | | | |
| $C_4F_9OCH_3$/cyclopentane | 42.8 | 29–83/17–71 | 45–83/17–55 |
| $C_4F_9OCH_3$/cyclohexane | 57.8 | 59–99/1–41 | 70–99/1–30 |
| $C_4F_9OCH_3$/cyclopentane/acetone | 42.8 | 1–82/17–85/1–59 | 60–82/17–30/1–30 |
| $C_4F_9OCH_3$/cyclohexane/acetone | 58.0 | 1–98/1–60/1–98 | 60–99/1–40/1–40 |
| $C_4F_9OCH_3$/trans-1,2-DCE/cyclopentane | 40.0 | 40–75/1–59/1–59 | 50–75/1–40/1–30 |
| $C_4F_9OCH_3$/trans-1,2-DCE/cyclopentane/methanol | 40.0 | 40–70/15–50/1–25/1–10 | 40–60/20–40/5–20/1–8 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention. All isomers of $C_4F_9OCH_3$ are believed to provide similar results.

EXAMPLE 1

Phase Study

A phase study shows the following compositions are azeotropic at substantially atmospheric pressure:

| Composition | Weight Percents | Vapor Press. psia | kPa | T(°C.) |
|---|---|---|---|---|
| $C_4F_9OCH_3$/cyclopentane | 57.1/42.9 | 14.68 | 101 | 42.8 |
| $C_4F_9OCH_3$/cyclohexane | 88.4/11.6 | 14.67 | 101 | 57.8 |

EXAMPLE 2

Impact of Vapor Leakage on Vapor Pressure

A vessel is charged with an initial composition at a specified temperature, and the vapor pressure of the composition is measured. The composition is allowed to leak from the vessel, while the temperature is held constant at the temperature specified, until 50 weight percent of the initial composition is removed, at which time the vapor pressure of the composition remaining in the vessel is measured. The results are summarized below.

| Refrigerant Weight Percent | 0 wt % evaporated Psia | kPa | 50 wt % evaporated Psia | kPa | % Change |
|---|---|---|---|---|---|
| $C_4F_9OCH_3$/cyclopentane (42.8° C.) | | | | | |
| 57.1/42.9 | 14.68 | 101 | 14.68 | 101 | 0.0 |
| 70/30 | 14.56 | 100 | 14.35 | 99 | 1.4 |
| 80/20 | 14.12 | 97 | 13.22 | 91 | 6.4 |
| 83/17 | 13.86 | 96 | 12.61 | 87 | 9.0 |
| 84/16 | 13.75 | 95 | 12.37 | 85 | 10.0 |
| 40/60 | 14.57 | 100 | 14.30 | 99 | 1.9 |
| 30/70 | 14.42 | 99 | 13.25 | 91 | 8.1 |
| 29/71 | 14.40 | 99 | 13.09 | 90 | 9.1 |
| 28/72 | 14.37 | 99 | 12.92 | 89 | 10.1 |
| $C_4F_9OCH_3$/cyclohexane (57.8° C.) | | | | | |
| 88.4/11.6 | 14.67 | 101 | 14.67 | 101 | 0.0 |
| 95/5 | 14.45 | 100 | 14.36 | 99 | 0.6 |
| 99/1 | 13.90 | 96 | 13.83 | 95 | 0.5 |
| 70/30 | 14.18 | 98 | 13.68 | 94 | 3.5 |
| 60/40 | 13.82 | 95 | 12.61 | 87 | 8.8 |
| 59/41 | 13.79 | 95 | 12.44 | 86 | 9.8 |
| 58/42 | 13.75 | 95 | 12.25 | 84 | 10.9 |
| $C_4F_9OCH_3$/cyclopentane/acetone (42.8° C.) | | | | | |
| 53.9/44.7/1.4 | 14.67 | 101 | 14.67 | 101 | 0.0 |
| 70/29/1 | 14.51 | 100 | 14.22 | 98 | 2.0 |
| 60/30/10 | 14.43 | 99 | 13.81 | 95 | 4.3 |
| 40/30/30 | 14.43 | 99 | 13.00 | 90 | 9.9 |
| 20/35/45 | 14.71 | 101 | 13.36 | 92 | 9.2 |
| 1/40/59 | 14.92 | 103 | 13.73 | 95 | 8.0 |
| 30/69/1 | 14.46 | 100 | 13.66 | 94 | 5.5 |
| 20/75/5 | 14.55 | 100 | 13.74 | 95 | 5.6 |
| 10/80/10 | 14.81 | 102 | 14.01 | 97 | 5.4 |
| 1/85/14 | 15.06 | 104 | 14.09 | 97 | 6.4 |
| 50/49/1 | 14.66 | 101 | 14.65 | 101 | 0.1 |
| 40/50/10 | 14.79 | 102 | 14.76 | 102 | 0.2 |
| 20/60/20 | 15.11 | 104 | 15.07 | 104 | 0.3 |
| 1/65/34 | 15.47 | 107 | 15.46 | 107 | 0.1 |
| 70/25/5 | 14.27 | 98 | 13.51 | 93 | 5.3 |
| 75/20/5 | 13.93 | 96 | 12.64 | 87 | 9.3 |
| 80/19/1 | 14.00 | 97 | 12.90 | 89 | 7.9 |
| 82/17/1 | 13.81 | 95 | 12.46 | 86 | 9.8 |
| $C_4F_9OCH_3$/cyclohexane/acetone (58.0° C.) | | | | | |
| 80.6/14.6/4.8 | 14.68 | 101 | 14.68 | 101 | 0.0 |
| 85/5/10 | 14.23 | 98 | 14.02 | 97 | 1.5 |
| 82/8/10 | 14.50 | 100 | 14.35 | 99 | 1.0 |
| 82/5/13 | 14.23 | 98 | 13.99 | 96 | 1.7 |
| 98/1/1 | 13.91 | 96 | 13.83 | 95 | 0.6 |
| 70/1/29 | 13.88 | 96 | 13.70 | 94 | 1.3 |
| 40/1/59 | 14.84 | 102 | 14.56 | 100 | 1.9 |
| 20/1/79 | 15.35 | 106 | 15.16 | 105 | 1.2 |
| 1/1/98 | 15.72 | 108 | 15.66 | 108 | 0.4 |
| 70/10/20 | 14.79 | 102 | 14.57 | 100 | 1.5 |
| 30/10/60 | 15.94 | 110 | 15.50 | 107 | 2.8 |
| 70/20/10 | 14.75 | 102 | 14.73 | 102 | 0.1 |
| 50/20/30 | 15.53 | 107 | 15.37 | 106 | 1.0 |
| 20/20/60 | 16.49 | 114 | 16.28 | 112 | 1.3 |
| 70/29/1 | 14.33 | 99 | 13.92 | 96 | 2.9 |
| 50/30/20 | 15.17 | 105 | 14.97 | 103 | 1.3 |
| 20/30/50 | 16.48 | 114 | 16.33 | 113 | 0.9 |
| 60/39/1 | 13.98 | 96 | 13.00 | 90 | 7.0 |
| 40/40/20 | 15.13 | 104 | 14.68 | 101 | 3.0 |
| 20/40/40 | 16.24 | 112 | 15.92 | 110 | 2.0 |
| 40/50/10 | 14.29 | 99 | 13.03 | 90 | 8.8 |
| 20/30/50 | 15.79 | 109 | 15.08 | 104 | 4.5 |
| 1/50/49 | 16.72 | 115 | 16.39 | 113 | 2.0 |
| 1/60/39 | 16.41 | 113 | 15.54 | 107 | 5.3 |
| $C_4F_9OCH_3$/trans-1,2-DCE/cyclopentane (40° C.) | | | | | |
| 63/20/17 | 14.67 | 101 | 14.52 | 100 | 1.0 |
| 70/29/1 | 15.33 | 106 | 15.21 | 105 | 0.8 |
| 75/24/1 | 15.26 | 105 | 14.87 | 103 | 2.6 |
| 40/1/59 | 13.27 | 91 | 13.03 | 90 | 1.8 |
| 40/59/1 | 15.24 | 105 | 14.56 | 100 | 4.5 |
| 50/30/20 | 14.76 | 102 | 14.68 | 101 | 0.5 |
| 60/10/30 | 14.00 | 97 | 13.87 | 96 | 0.9 |
| 50/40/10 | 15.11 | 104 | 15.04 | 104 | 0.5 |
| 60/30/10 | 15.07 | 104 | 15.02 | 104 | 0.3 |
| 60/20/20 | 14.59 | 101 | 14.47 | 100 | 0.8 |
| 65/20/15 | 14.73 | 102 | 14.53 | 100 | 1.4 |
| $C_4F_9OCH_3$/trans-1,2-DCE/cyclopentane/methanol (40° C.) | | | | | |
| 59/20/15/6 | 15.31 | 106 | 14.82 | 102 | 3.2 |
| 70/15/10/5 | 15.09 | 104 | 13.61 | 94 | 9.8 |
| 40/35/20/5 | 15.49 | 107 | 15.48 | 107 | 0.1 |
| 70/20/5/5 | 15.33 | 106 | 13.94 | 96 | 9.1 |
| 50/20/25/5 | 15.24 | 105 | 15.13 | 104 | 0.7 |
| 70/15/14/1 | 14.86 | 102 | 14.27 | 98 | 4.0 |
| 40/35/24/1 | 15.11 | 104 | 14.74 | 102 | 2.4 |
| 50/35/5/10 | 15.40 | 106 | 14.86 | 102 | 3.5 |
| 57/22/16/5 | 15.37 | 106 | 15.11 | 104 | 1.7 |
| 49/30/15/6 | 15.50 | 107 | 15.40 | 106 | 0.6 |
| 55/25/14/6 | 14.98 | 103 | 14.65 | 101 | 2.2 |
| 50/39/1/10 | 14.67 | 101 | 14.03 | 97 | 4.4 |
| 40/50/5/5 | 15.00 | 103 | 15.00 | 103 | 0.0 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 25° C.

A leak test is performed on compositions of $C_4F_9OCH_3$ and cyclohexane, at the temperature of 25° C. The results are shown below:

| Refrigerant Weight Percent | 0 wt % evaporated Psia | kPa | 50 wt % evaporated Psia | kPa | % Change |
|---|---|---|---|---|---|
| $C_4F_9OCH_3$/cyclohexane (42.8° C.) | | | | | |
| 89.7/10.3 | 4.33 | 30 | 4.33 | 30 | 0.0 |
| 95/5 | 4.28 | 30 | 4.26 | 29 | 0.5 |
| 99/1 | 4.13 | 28 | 4.11 | 28 | 0.5 |
| 70/30 | 4.16 | 29 | 3.99 | 28 | 4.1 |
| 61/39 | 4.06 | 28 | 3.69 | 25 | 9.1 |
| 60/40 | 4.05 | 28 | 3.63 | 25 | 10.4 |

These results show that compositions of $C_4F_9OCH_3$ and cyclohexane are azeotropic or azeotrope-like at different temperatures, but that the weight percents of the components vary as the temperature is changed.

EXAMPLE 4

$C_4F_9OCH_3$ Isomer Effect On Vapor Leakage

A vessel is charged with an initial composition at a specified temperature, and the vapor pressure of the composition is measured. The composition is allowed to leak from the vessel, while the temperature is held constant at the temperature specified, until 50 weight percent of the initial composition is removed, at which time the vapor pressure of the composition remaining in the vessel is measured. The results are summarized below.

| Refrigerant | 0 wt % evaporated | | 50 wt % evaporated | | % |
|---|---|---|---|---|---|
| Weight Percent | Psia | kpa | Psia | kPa | Change |
| $CF_3CF_2CF_2CF_2OCH_3$/cyclopentane (42.8° C.) | | | | | |
| 57.1/42.9 | 14.68 | 101 | 14.68 | 101 | 0.0 |
| 70/30 | 14.56 | 100 | 14.35 | 99 | 1.4 |
| 80/20 | 14.12 | 97 | 13.22 | 91 | 6.4 |
| 83/17 | 13.86 | 96 | 12.61 | 87 | 9.0 |
| 84/16 | 13.75 | 95 | 12.37 | 85 | 10.0 |
| 40/60 | 14.57 | 100 | 14.30 | 99 | 1.9 |
| 30/70 | 14.42 | 99 | 13.25 | 91 | 8.1 |
| 29/71 | 14.40 | 99 | 13.09 | 90 | 9.1 |
| 28/72 | 14.37 | 99 | 12.92 | 89 | 10.1 |
| $(CF_3)_2CFCF_2OCH_3$/cyclopentane (42.8° C.) | | | | | |
| 57.1/42.9 | 14.68 | 101 | 14.68 | 101 | 0.0 |
| 70/30 | 14.56 | 100 | 14.35 | 99 | 1.4 |
| 80/20 | 14.12 | 97 | 13.22 | 91 | 6.4 |
| 83/17 | 13.86 | 96 | 12.61 | 87 | 9.0 |
| 84/16 | 13.75 | 95 | 12.37 | 85 | 10.0 |
| 40/60 | 14.57 | 100 | 14.30 | 99 | 1.9 |
| 30/70 | 14.42 | 99 | 13.25 | 91 | 8.1 |
| 29/71 | 14.40 | 99 | 13.09 | 90 | 9.1 |
| 28/72 | 14.37 | 99 | 12.92 | 89 | 10.1 |
| $(CF_3)_3COCH_3$/cyclopentane (42.8° C.) | | | | | |
| 57.1/42.9 | 14.68 | 101 | 14.68 | 101 | 0.0 |
| 70/30 | 14.56 | 100 | 14.35 | 99 | 1.4 |
| 80/20 | 14.12 | 97 | 13.22 | 91 | 6.4 |
| 83/17 | 13.86 | 96 | 12.61 | 87 | 9.0 |
| 84/16 | 13.75 | 95 | 12.37 | 85 | 10.0 |
| 40/60 | 14.57 | 100 | 14.30 | 99 | 1.9 |
| 30/70 | 14.42 | 99 | 13.25 | 91 | 8.1 |
| 29/71 | 14.40 | 99 | 1309 | 90 | 9.1 |
| 28/72 | 14.37 | 99 | 1292 | 89 | 10.1 |

The results show different isomers of $C_4F_9OCH_3$ provide equivalent azeotrope points and leak performance.

EXAMPLE 5

Refrigerant Performance

The following table shows the performance of various refrigerants. The data are based on the following conditions.

| | |
|---|---|
| Evaporator temperature | 40.0° F. (4.4° C.) |
| Condenser temperature | 110.0° F. (43.3° C.) |
| Subcool | 10.0° F. (5.6° C.) |
| Return gas temperature | 75.0° F. (23.8° C.) |
| Compressor efficiency is 70%. | |

The refrigeration capacity is based on a compressor with a fixed displacement of 3.5 cubic feet per minute and 70% volumetric efficiency.

Capacity is intended to mean the change in enthalpy of the refrigerant in the evaporator per pound of refrigerant circulated, i.e., the heat removed by the refrigerant in the evaporator per time. Coefficient of performance (COP) is intended to mean the ratio of the capacity to compressor work. It is a measure of refrigerant energy efficiency.

| | Evap. Press. | | Cond. Press. | | Compr. Disch. T. | | | Capacity | |
|---|---|---|---|---|---|---|---|---|---|
| | Psia | kPa | Psia | kPa | (°F.) | (°C.) | COP | Btu/min | kW |
| $C_4F_9OCH_3$/cyclopentane | | | | | | | | | |
| 1/99 | 2.6 | 18 | 11.9 | 82 | 155.6 | 68.7 | 4.24 | 16.3 | 0.29 |
| 99/1 | 1.6 | 11 | 8.8 | 61 | 131.5 | 55.3 | 4.01 | 10.3 | 0.18 |
| $C_4F_9OCH_3$/cyclohexane | | | | | | | | | |
| 1/99 | 0.7 | 5 | 4.2 | 29 | 150.7 | 65.9 | 4.28 | 5.3 | 0.09 |
| 99/1 | 1.5 | 10 | 8.4 | 58 | 131.4 | 55.2 | 3.94 | 9.7 | 0.17 |
| $C_4F_9OCH_3$/cyclopentane/acetone | | | | | | | | | |
| 98/1/1 | 1.8 | 12 | 9.7 | 67 | 132.1 | 55.6 | 4.15 | 12.0 | 0.21 |
| 1/98/1 | 2.6 | 18 | 12.0 | 83 | 155.9 | 68.8 | 4.25 | 16.4 | 0.29 |
| 1/1/98 | 1.9 | 13 | 9.6 | 66 | 202.4 | 94.7 | 4.73 | 14.7 | 0.26 |
| $C_4F_9OCH_3$/cyclohexane/acetone | | | | | | | | | |
| 98/1/1 | 1.7 | 12 | 9.3 | 64 | 131.9 | 55.5 | 4.12 | 11.4 | 0.20 |
| 1/98/1 | 0.8 | 6 | 4.3 | 30 | 151.2 | 66.2 | 4.29 | 5.5 | 0.10 |
| 1/1/98 | 1.9 | 13 | 9.5 | 66 | 202.3 | 94.6 | 4.73 | 14.6 | 0.26 |
| $C_4F_9OCH_3$/trans-1,2-DCE/cyclopentane | | | | | | | | | |
| 98/1/1 | 1.7 | 12 | 9.5 | 66 | 131.7 | 55.4 | 4.13 | 11.6 | 0.20 |
| 1/98/1 | 2.8 | 19 | 13.1 | 90 | 229.0 | 109.4 | 4.60 | 20.1 | 0.35 |
| 1/1/98 | 2.6 | 18 | 12.0 | 83 | 155.8 | 68.8 | 4.24 | 16.4 | 0.29 |
| $C_4F_9OCH_3$/trans-1,2-DCE/cyclopentane/methanol | | | | | | | | | |
| 97/1/1/1 | 1.9 | 13 | 10.4 | 72 | 134.9 | 57.2 | 4.19 | 12.9 | 0.23 |
| 1/97/1/1 | 2.9 | 20 | 13.8 | 95 | 231.0 | 110.6 | 4.57 | 21.0 | 0.37 |
| 1/1/97/1 | 2.7 | 19 | 12.5 | 86 | 162.2 | 72.3 | 4.23 | 17.0 | 0.30 |
| 88/1/1/10 | 2.6 | 18 | 14.1 | 97 | 159.6 | 70.9 | 4.27 | 18.2 | 0.32 |

EXAMPLE 6

Several single sided circuit boards were coated with Alpha 611F RMA rosin flux, then activated by heating to 165° C. for two minutes. The boards were defluxed in a boiling solution of 55.0 weight percent $C_4F_9OCH_3$, 25.0 weight percent trans-dichloroethylene, 14.0 weight percent cyclopentane, and 6.0 weight percent methanol. The cleaning cycle consisted of 2 minutes immersion in boiling solution followed by 30 seconds dwell time in the vapor. After cleaning, the boards showed no visible residue remaining thereon.

EXAMPLE 7

Samples of chamber deposits containing a polymer of carbon, fluorine, hydrogen and possibly other atoms were soaked in a solution of 85.0 weight percent $C_4F_9OCH_3$, 5.0 eight percent cyclohexane and 10.0 weight percent acetone for one hour. The solid deposits were softened and appeared to become gel like. The softened deposits were then mechanically removed leaving a clean surface.

The novel compositions of this invention, including the azeotropic or azeotrope-like compositions, may be used as cleaning agents to clean, for example, electronic circuit boards. It is preferred that cleaning agents be azeotropic or azeotrope-like because in vapor degreasing operations, the cleaning agent is generally redistilled and reused for final rinse cleaning. The novel compositions may also be used as displacement drying agents to remove water from surfaces and as wipe solvents.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The novel compositions of this invention are particularly suitable for replacing compounds that may affect the ozone layer, including R-113 and R-11.

In addition to cleaning and refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

ADDITIONAL COMPOUNDS

Other components, such as aliphatic hydrocarbons having a boiling point of about 0° to 100° C., hydrofluorocarbon-alkanes having a boiling point of about 0° to 100° C., hydrofluoropropanes having a boiling point of between about 0° to 100° C., hydrocarbon esters having a boiling point between about 0° to 100° C., hydrochlorofluorocarbons having a boiling point between about 0° to 100° C., hydrofluorocarbons having a boiling point of about 0° to 100° C., hydrochlorocarbons having a boiling point between about 0° to 100° C., chlorocarbons and perfluorinated compounds, can be added in small amounts to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provide they do not have an adverse influence on the composition for its intended application. Preferred lubricants include esters having a molecular weight greater than 250.

What is claimed is:

1. An azeotropic or azeotrope-like composition comprising: 29–83 weight percent nonafluoromethoxybutane and 17–71 weight percent cyclopentane; 1–82 weight percent nonafluoromethoxybutane, 17–85 weight percent cyclopentane and 1–59 acetone; 1–98 weight percent nonafluoromethoxybutane, 1–60 weight percent cyclohexane and 1–98 weight percent acetone; 40–75 weight percent nonafluoromethoxybutane, 1–59 weight percent trans-1,2-dichloroethylene and 1–59 cyclopentane; or 40–70 weight percent nonafluoromethoxybutane, 15–50 weight percent trans-1,2-dichloroethylene, 1–25 weight percent cyclopentane and 1–10 weight percent methanol.

2. The azeotropic or azeotrope-like composition of claim 1, said composition comprising: 45–83 weight percent nonafluoromethoxybutane and 17–55 weight percent cyclopentane; 60–82 weight percent nonafluoromethoxybutane, 17–30 weight percent cyclopentane and 1–30 acetone; 60–99 weight percent nonafluoromethoxybutane, 1–40 weight percent cyclohexane and 1–40 weight percent acetone; 50–75 weight percent nonafluoromethoxybutane, 1–40 weight percent trans-1,2-dichloroethylene and 1–30 cyclopentane; or 40–60 weight percent nonafluoromethoxybutane, 20–40 weight percent trans-1,2-dichloroethylene, 5–20 weight percent cyclopentane and 1–8 weight percent methanol.

3. A process for producing refrigeration, comprising condensing a composition of claim 1, and thereafter evaporating said composition in the vicinity of the body to be cooled.

4. A process for producing refrigeration, comprising condensing a composition of claim 2, and thereafter evaporating said composition in the vicinity of the body to be cooled.

5. A process for atomizing a fluid comprising using a composition of claim 1 as an aerosol propellant.

6. A process for atomizing a fluid comprising using a composition of claim 2 as an aerosol propellant.

7. A process for cleaning a solid surface which comprises treating said surface with a composition of claim 1.

8. A process for cleaning a solid surface which comprises treating said surface with a composition of claim 2.

9. A process for transfer of heat from a heat source to a heat sink with a composition of claim 1.

10. A process for transfer of heat from a heat source to a heat sink with a composition of claim 2.

* * * * *